United States Patent [19]

Peavy

[11] Patent Number: 5,552,500
[45] Date of Patent: Sep. 3, 1996

[54] FLUOROALKENE/HYDRO-CHLOROFLUOROCARBON TELOMERS AND THEIR SYNTHESIS

[75] Inventor: Richard E. Peavy, Hockessin, Del.

[73] Assignee: E. I. Du Pont de Nemours and Company, Wilmington, Del.

[21] Appl. No.: 427,329

[22] Filed: Apr. 24, 1995

[51] Int. Cl.⁶ ........................................ C08F 2/00
[52] U.S. Cl. ........................... 526/206; 526/255
[58] Field of Search ............................ 526/206

[56] References Cited

U.S. PATENT DOCUMENTS

| | | |
|---|---|---|
| 3,067,262 | 12/1962 | Brady . |
| 3,658,742 | 4/1972 | Fish et al. ............................. 526/206 |
| 4,717,744 | 1/1988 | Boutevin et al. .................... 526/206 |
| 5,310,870 | 5/1994 | Peavy ................................... 526/206 |

FOREIGN PATENT DOCUMENTS

| | | | |
|---|---|---|---|
| 42-19252 | 9/1967 | Japan | 526/206 |
| 49-11746 | 3/1974 | Japan | 526/206 |
| 51-41085 | 4/1976 | Japan | 526/206 |

OTHER PUBLICATIONS

Kitada et al, JP06248149 pp. 2 & 3 abstract.

*Primary Examiner*—Joseph L. Schofer
*Assistant Examiner*—N. Sarofim

[57] ABSTRACT

The invention relates to fluorotelomers, their synthesis by free radical-initiated telomerization of fluoroalkenes (e.g. TFE) in which hydrochlorofluorocarbons (HCFC's) are used both as telogens and as solvents, and dispersions of the fluorotelomers in HCFC's. The fluorotelomers are normally solid, essentially non-distillable and highly crystalline, and their dispersions exhibit excellent lubricant properties and stability under normal usage and have a negligible impact on the environment compared to conventional telomer dispersions.

9 Claims, No Drawings

FLUOROALKENE/HYDRO-CHLOROFLUOROCARBON TELOMERS AND THEIR SYNTHESIS

FIELD OF THE INVENTION

This invention is directed to a class of wax-like fluorotelomer solids having broad utility as insoluble, chemically and thermally stable lubricants, release agents, and thickening agents and methods of preparing them.

BACKGROUND OF THE INVENTION

Wax-like fluorotelomer solids are described by Brady in U.S. Pat. No. 3,067,262. Such wax-like solids heretofore have been based predominantly on a fluorotelomer backbone of polytetrafluoroethylene (PTFE) formed by telomerization of tetrafluoroethylene (TFE) in trichlorotrifluoroethane (TCTFE) in the presence of a peroxide free-radical initiator, with or without a so-called "Active Telogen" (chain transfer agent) to limit the molecular weight of the waxy telomer products, wherein TCTFE served both as a solvent and as a telogen. Telomerization can be defined as a reaction between two substances in which one substance provides the terminal groups (telogen) and the other provides the internal linkages of the telomer. An example is a free radical initiated reaction wherein an ethylenically unsaturated monomer, "A", reacts with a telogen, "YZ", to yield telomer:

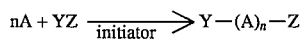

In a preferred prior art system, the monomer, "A", is tetrafluoroethylene (TFE), and the telogen, "YZ", is 1,1,2-trichloro-1,2,2-trifluoroethane (TCTFE). The resulting fluorotelomers are dispersed in TCTFE and, as such, provide waxy solid polymer dispersions that exhibit excellent dry lubricating properties which are used commercially.

However, chlorofluorocarbons, such as TCTFE, can be degraded in the presence of UV light to give chlorine free radicals which can react with ozone. Therefore, they are believed by some to be a major factor in the depletion of the protective ozone layer in the upper atmosphere. In addition, chlorofluorocarbons, such as TCTFE, may cause global warming. As a result of the widely perceived threat of certain CFC's to the ozone layer in the upper atmosphere and of their involvement in global warming, the manufacture and use of some CFC's, including TCTFE, will be banned in the future. Consequently, a replacement telogen/solvent must be found if production and use of versatile fluorotelomer dispersions are to continue. However, the chlorine content of CFC's would be expected to make them more active chain transfer agents (telogens) than chlorine-free fluorocarbons. It does not follow, therefore, that just any fluorine-containing organic carbon compounds can be substituted for CFC's as combined telogens/solvents. The challenge becomes that of finding substitute combined solvents/telogens that will allow the continued manufacture of fluorotelomer and their dispersions with no significant deviation in properties or performance in handling, manufacture, testing, and perceived quality.

SUMMARY OF THE INVENTION

This invention relates to novel fluorotelomers, their synthesis by free radical initiated telomerization in which organic compounds containing hydrogen, chlorine, fluorine, and carbon (hydrochlorofluorocarbons or HCFC's) are used both as telogens and as solvents, and dispersions prepared from such telomers. The telomers thereby obtained are normally solid, essentially non-distillable highly crystalline fluoro- telomers of a fluoroalkene, e.g., of TFE, and hydrochlorofluorocarbon telogens. The fluorotelomers of this invention and their dispersions exhibit excellent lubricant properties and stability under normal usage and have a negligible impact on the environment compared to conventional telomer dispersions.

DETAILED DESCRIPTION OF THE INVENTION

This invention provides wax-like normally solid, fluorotelomers using HCFC's both as solvents and telogens, optionally with an "Active Telogen" to control molecular weight. Dispersions of the resulting new fluorotelomer in the HCFC solvent/telogen match the properties and performance of conventional dispersions, including those currently made based on TCTFE solvent/telogen, thereby achieving the least disruption of existing applications. The HCFC solvent/telogen has substantially less negative environmental impact than the TCTFE solvent/telogen presently used in the manufacture of these important wax-like solids. This invention relates also to a method of preparing a fluorocarbon telomer, wherein the fluoroalkene monomer is telomerized in an HCFC which functions both as a reaction medium and a telogen. In addition, this invention relates to dispersions of the telomers of this invention in the HCFC's in which they were prepared.

The telogen/solvents of this invention have the formula

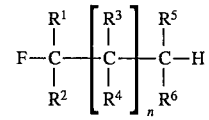

wherein $R^1$, $R^2$, $R^3$ and $R^4$ are each independently Cl or F;

$R^5$ and $R^6$ are each independently H, Cl or F; provided that when one of $R^5$ or $R^6$ is F, the other is H;

and n is 0 or 1.

The hydrochlorofluorocarbons (HCFCs) used to produce the fluorotelomers of this invention have a boiling point within or near the range of about 25° to 100° C. thereby allowing for economical usage and recovery. Illustrative examples of the telogen/solvents are the following:

1,1-dichloro-1-fluoroethane ($Cl_2CF$—$CH_3$);

1,2,2-trichloro- 1, 1-difluoroethane ($ClCF_2$—$CHCl_2$);

1,1-dichloro-2,2,2-trifluoroethane ($Cl_2CH$—$CF_3$);

1,1-dichloro- 1,2-difluoroethane ($Cl_2CF$—$CFH_2$);

1,1-dichloro-2,2,3,3,3-pentafluoropropane ($Cl_2CHCF_2F_5$);

1,3-dichloro- 1,2,2,3,3-pentafluoropropane ($ClCFH$—$CF_2CF_2Cl$); and 2,2-dichloro- 1,1,3,3,3-pentafluoropropane ($F_2CH$—$CCl_2$—$CF_3$); or mixtures thereof.

The HCFC preferred for the purposes of this invention is 1,1-dichloro- 1-fluoroethane. Preferred dispersions of these fluorotelomers in hydrochlorofluorocarbon solvent provide coatings with a static coefficient of friction equal to or less than 0.35 and most preferably less than coatings obtained from TCTFE-based dispersions. The preferred dispersions of this invention are those of Tables 1 and 2; they either match or exceed the performance of TCTFE-based dispersions in other applications as well. The most preferred dispersions are those of Examples 1 and 7.

There are at least two classes of telomers which are in common use commercially. One of them has a number average molecular weight in the 3,000 to 6,000 range, preferably 4000 to 5000; the other has a number average molecular weight in the range between 15,000 and 75,000, preferably 25,000 to 35,000. The shorter chain lengths in the first class of telomers result from the use of the telogen/solvents of this invention plus so-called "active telogens" (or "chain transfer agents") which on reaction with TFE produce predominantly molecules which contain about 30 to 60 TFE units per active telogen unit. Methylcyclohexane is an example of such an "Active Telogen" which yields a majority of H— and $C_7H_{13}$— terminated telomer ends, with only a minor number of ends from the telogen/solvents of this invention.

In a preferred embodiment, said fluorotelomers have crystalline melting points in the range of 260° to 327° C., as determined by differential scanning calorimetry. In another preferred embodiment, this invention relates to a dispersion of fluorotelomer comprising the above-described telomers in the above-described HCFC telogen/solvents.

TFE and hexafluoropropylene are the preferred fluoroalkene monomers, TFE being most preferred. Homotelomers are preferred but fluoroalkene copolymers are also included in all monomer ratios, the amount of comonomer typically being 0.3 to 3 wt. % of the copolymer. Ethylenically unsaturated compounds can be used as comonomers in producing the fluorotelomer dispersions of the present invention, the amount of comonomer typically being 0.3 to 3 wt. % of the copolymer. Preferred comonomers are selected from highly fluorinated (e.g., perfluorinated) ethylenically unsaturated monomers, other than TFE. The most preferred for TFE is perfluoropropylene.

In a particular embodiment, this invention relates to novel fluorotelomers, and to a method for producing the same, which comprises reacting a fluoroalkene monomer of from 2–3 carbon atoms and 2–6 fluorine atoms, or a mixture thereof with a copolymerizable monomer, with a HCFC telogen in solution in said HCFC in the presence of a free radical initiator at a temperature in excess of 105° C. and up to 200° C., wherein said HCFC consists essentially of an organic compound having a boiling point at atmospheric pressure between 25° C. and 100° C. and containing 2 or 3 carbon atoms, chlorine, and fluorine, and at least one hydrogen atom, and recovering a fluorotelomer having a number molecular weight between 1800 and 75,000.

In the absence of "Active Telogen" (also referred to herein as a chain transfer agent), telomer chain growth is stopped by incorporation of telomer/solvent into the telomer. However, there will also be a relatively small amount of chain transfer derived from the decomposition of the free radical initiator used in the telomerization reaction as fully conventional. An "Active Telogen" will provide a majority of the end groups, typically, for example, from 70% to 80% to the exclusion of the hydrochlorofluorocarbon solvent/telogens, in conventional dependence on the quantity used. The "active telogens" that can be used in forming the fluorotelomers of the present invention include all of those well known in the prior art, e.g., tertiary hydrocarbons, cyclic aliphatic hydrocarbons such as methylcyclohexane, aliphatic ethers with alpha hydrogen atoms, aliphatic alcohols containing an alpha hydrogen such as isopropanol and ethanol, bivalent aliphatic sulfur compounds, tertiary aliphatic amines such as triethylamine, aliphatic carbonyl compounds (aldehydes, ketones, diketones, acids, esters, etc.) containing an alpha hydrogen atom such as acetone and tetrahydrofuran, dialkyl phosphites, dialkylamides, etc. The most preferred species is methylcyclohexane; cyclohexane is also preferred. Preferably, less than 4.0 mole % of active telogen are used based on the total number of moles of monomer so as to provide fluorotelomers which are not too short in length, e.g., 1.0–4.0 mole %, preferably 2.5 mole %, based on the number of moles of monomer.

Many free radical initiators will initiate reaction to produce the fluorotelomers of this invention in the presence of hydrochlorofluorocarbon solvent/telogen and fluoroalkene monomer. Preferred free radical initiators are ditertiary-butyl peroxide, tertiary-butyl peroxybenzoate, t-amyl peroxy-2-ethylhexanoate. t-butyl peroxyisobutyrate, t-butyl peroxy-2-ethylhexanoate, benzoyl peroxide, and azo initiators such as 1,1-azobis(cyanocyclohexane), most preferably t-butylperoxy-2-ethylhexanoate or t-amylperoxy-2-ethylhexanoate. The amount of free radical initiator used preferably falls within the range of 0.20 to 4.0 wt. %. most preferably 0.4 to 3 wt. %, based on the weight of monomers to be polymerized.

The process of the present invention provides a high degree of monomer conversion to telomer of above 50%, typically above 75% and often above 90%, depending on the fluorotelomer product. The telomerization reaction typically proceeds at temperatures in excess of 105° to about 180° at pressures that range from 100 to 700 psig. The preferred reaction time is 1–2 hours for continuous and 1–6 hours for batch reaction. Preferably, the reaction temperature falls within the range of 110–130° C. and the pressure is kept at a maximum in the range of 400–600 psig. Most preferably, the reaction temperature is in the range of 110–125° C. at 500 psig in a continuous flow reactor where reaction proceeds for from 1–2 hours. A batch reactor is most preferably at an autogenous pressure with temperatures in the range of 120–150° C., and the reaction proceeds for from 4–6 hours. The total amount of monomer in tile telogen/solvent generally is preferably at a molar ratio of telogen:monomer of 2:1 to 8:1. High ratios provide telomers of lower molecular weight.

After reaction, the fluorotelomer is recovered as a dispersion in the hydrochlorofluorocarbon solvent/telogen, as is conventional. The dispersion typically contains from 5–20 wt. % of the fluorotelomer, with dispersions of high molecular weight fluorotelomers, falling at the low end of the range. These dispersions will provide coatings having static coefficient of friction less than 0.35, as determined by the conventional inclined plane test wherein Kraft paper, coated with the dispersions and dried, is used for the plane and slide. The angle of inclination of the plane at which the slide moves on the plane, theta, defines the static coefficient of friction, which is quantified by the following formula:

tan theta=mu, wherein mu is the static coefficient of friction.

The following general procedures were used in preparing the fluorotelomers referred to in the examples that follow this discussion.

Continuous

A solution of free radical initiator (catalyst) and active telogen, if used, is prepared in the solvent of choice. The solution is poured into a 1 liter, 316 stainless steel autoclave until almost full, and the remaining solution is placed in a large, cooled (10–12° C.) reservoir. The autoclave is closed, and heating and agitation (500–1,000 rpm) initiated. When the autoclave contents are close to the desired temperature, catalyst solution is pumped into the autoclave at a rate to provide a residence time of from one to two hours. Autoclave pressure is controlled by means of a back pressure control valve set at 500–600 psi. When temperature and pressure are in the desired ranges, monomer feed is started. Catalyst and monomer feeds are maintained for as long as desired, with continuous removal of product dispersion. When sufficient product has been collected, monomer feed is discontinued while the liquid feed is continued for another 30 min. Cooling is applied, and the reactor shut down.

Batch

A 400 ml Hasteloy shaker bomb is purged with nitrogen and charged with a dilute solution of the free radical initiator and optionally, an active telogen, in 125–300 ml total volume of a hydrochlorofluorocarbon(s) telogen/solvent. The shaker bomb is then sealed, cooled to 10–15° C., and evacuated. About 0.3 to 0.4 mol of monomer is then added to the bomb. The shaker is started, and the bomb and its contents are heated to the reaction temperature and held at that temperature until pressure measurements indicate that essentially all of the monomer has been consumed. Heating is then stopped and the bomb is cooled again to 15° C. before discharging the contents into a tared vessel to determine the weight of recovered fluorotelomer dispersion and, after removal of unreacted solvent, the weight and percentage of the fluorotelomer made.

The number average molecular weights of the telomers of this invention were calculated from their crystalline melting points, using the formula derived by Flory in his textbook "Principles of Polymer Chemistry", published by the Cornell University Press (the same method was used for similar products in U.S. Pat. No. 3,067,262), as follows:

$$M_n = \frac{200}{685 \left[ \frac{1}{T_m} - \frac{1}{600} \right]}$$

wherein $M_n$ is the number average molecular weight and $T_m$ is the crystalline melting point in degrees Kelvin, the crystalline melting points having been determined from the loss of birefrigence, as observed through crossed polarizers of a hot-stage microscope, or by use of a Differential Scanning Calorimeter.

The following Examples are given to further illustrate the invention but they are not to to be considered a limitation.

EXAMPLES

Continuous Conditions with "Active Telogen"

Example 1

A solution of 0.88 wt. % t-butyl peroxy-2-ethylhexanoate (TBEHex) and 0.45 wt. % methylcyclohexane ("Active Telogen") in 1,1,-dichloro-1fluoroethane was prepared and charged into a 1—1 stainless steel, continuously stirred autoclave. Additional solution was placed in a 4 liter reservoir set up to feed into the autoclave. The autoclave was closed, and catalyst solution fed into the unit until it was completely full of liquid. Agitation was started at 1,000 rpm and the back pressure control regulator set to control at 500 psi. The autoclave was heated to 115° C. When the temperature reached 110° C., catalyst feed was initiated at a feed rate of 13.7 g/min. When the temperature reached 113° C., uninhibited tetrafluoroethylene (TFE) gas was introduced into the autoclave at a rate of 3.2 g/min. Feed rates, temperature and pressure were maintained as described until steady state conditions were achieved (about 3 hours), and then product (a thick, translucent dispersion containing 16% polymer solids) was collected for as long as the run was continued (generally 5–6 hours). At steady state, polymer was obtained in 83% conversion, with a melting point of 282° C. (by DSC) and number average molecular weight ($M_n$) of 4200.

Examples 2–5

Examples 2–5 were carried out using the procedure of Example 1, as shown in Table 1 to give the conversions and molecular weights shown in Table 1.

TABLE 1

| | Catalyst | | Reaction | | | |
|---|---|---|---|---|---|---|
| Example | wt. % | wt. % MCH | Time, hr. | Temp. °C. | % Conv. | $M_n$ |
| 2 | Lupersol 80 (0.88) | 0.44 | 2 | 110 | 80 | 4100 |
| 3 | TBPB (0.70) | 0.40 | 1.5 | 140 | 73 | 4200 |
| 4 | TBEHex (0.69) | 0.49 (cyclohexane) | 1.5 | 115 | 83 | 4000 |
| 5 | TBPB (0.28) | 0.42 ($CF_3CHCl_2$) | 2 | 125 | 61 | 4000 |
| 6 | TBPB (0.35) | 0.48 | 2 | 125 | 69 | 5700 |

MCH = methylcyclohexane
Lupersol 80 = t-butyl peroxyisobutyrate
TBPB = t-butyl peroxybenzoate
TBEHEX = t-butyl peroxy-2-ethylhexanoate
CONV. = Conversion Example 6

The procedure of Example 5 was repeated at 125° C. using a mixture of 65% $CF_3CHCl_2$ and 35% $CF_3CFCl_2$ as the telogen/solvent giving conversion of 69% and a number average molecular weight of 5700.

The product of each of Examples 1–6 can be sold as a dispersion in the polymerization solvent (e.g., the HCFC) or in some other solvent (such as isopropyl alcohol or water) after conducting the appropriate solvent exchange procedure.

Examples 7–10

The procedure of Example 1 was repeated as set forth in Table 2, except that no "Active Telogen" was used. Reaction conditions and results are summarized in Table 2.

TABLE 2

Continuous Conditions
No "Active Telogen"

| Example | Telogen/ Solvent | Reaction Temp. °C. | % Conversion | $M_n$ |
|---|---|---|---|---|
| 7 | $CH_3CFCl_2$ | 105 | 88 | 35,000 |
| 8 | $CH_3CFCl_2$ | 110 | 79 | 21,000 |
| 9 | $CH_3CFCl_2$ | 130 | 82 | 21,000 |
| 10 | $CF_3CHCl_2$ | 125 | 74 | 5,000 |

Elemental analyses for some of the foregoing Examples are set forth in Table 3.

TABLE 3

Elemental Analyses

| Example | % C | % H | % Cl | % F |
|---|---|---|---|---|
| 1 | 25.44 | .48 | .23 | 71.97 |
| 2 | 24.92 | .50 | .25 | 70.96 |
| 3 | 24.41 | .39 | .33 | 73.15 |
| 5 | 24.34 | .37 | 1.45 | 71.05 |
| 7 | 23.14 | .04 | .32 | 76.94 |
| 8 | 23.49 | .14 | .23 | 76.81 |
| 9 | 23.24 | .11 | .33 | 71.07 |
| 10 | 23.32 | 0.00 | 1.43 | 70.22 |

EXAMPLES

Batch Conditions

Example 11

A 400 ml Hasteloy C shaker tube was cooled to 15° C. and purged with nitrogen. A solution of 0.4 g. di-tert.-butyl peroxide and 1.13 g. nethylcyclohexane ("Active Telogen") in 200 ml of 1,1-dichloro-1-fluoroethane was charged into the shaker robe, and the bomb closed. The cold bomb was pressurized to 100 psi with nitrogen, then evacuated under vacuum. Tetrafluoroethylene (TFE), 40 g., was charged, and the bomb placed on a shaker in a barricade. The shaker tube was agitated, and then heated to 180° C., and held for hours at this temperature. The bomb was cooled to 15° C., vented, and the contents discharged into a jar. A thick, translucent dispersion, 236 g., was obtained containing 11.4% polymer solids (68% conversion) with a number average mol. wt. of 2100.

Examples 12–15

The procedure of Example 11 was repeated as set forth in Table 4.

TABLE 4

Batch Conditions
With "Active Telogen"

| Example | Telogen/ Solvent | Reaction Temp. °C. | Time hr. | % Conv. | $M_n$ |
|---|---|---|---|---|---|
| 12 | $CF_3CHCl_2$ | 180 | 4 | 68 | 2,000 |
| 13 | $CH_3CFCl_2$/ $CF_3CHCl_2$ (61/39 wt. %) | 180 | 4 | 90 | 2,400 |
| 14 | $CFCl_2CH_2F$ | 180 | 4 | 77 | 2,300 |
| 15 | $C_2F_5CHCl_2$/ $CF_2ClCF_2CHFCl$ (59/41 wt. %) | 120 | 6 | 88 | 2,500 |

Example 16

A 400 ml Hasteloy C shaker tube was cooled as in Example 11 and charged with a solution of 0.16 g. di-tert.-butyl peroxide in 300 ml of 1,1-dichloro-1-fluoroethane (no ("Active Telogen"). TFE, 40 g., was added and the shaker tube heated to 150° C. for 6 hours. Obtained 371 g. of creamy dispersion containing 9.5% polymer solids (88% conversion) $M_n$ of 30,000.

Examples 17–21

The procedure of Example 11 was repeated as set forth in Table 5, except that no "Active Telogen" was used.

TABLE 5

Batch Conditions
No "Active Telogen"

| Example | Telogen/ Solvent | Reaction Temp. °C. | Time hr. | % Conv. | $M_n$ |
|---|---|---|---|---|---|
| 17 | $CF_3CHCl_2$ | 150 | 6 | 95 | 11,500 |
| 18 | $CH_3CFCl_2$/ $CF_3CHCl_2$ (61/39 wt. %) | 150 | 6 | 96 | 26,000 |
| 19 | $CHCl_2CF_2Cl$ | 150 | 6 | 100 | 10,400 |
| 20 | $CFCl_2CH_2F$ | 115 | 6 | 100 | 28,000 |
| 21 | $C_2F_5CHCl_2$/ $CF_2ClCF_2CHFCl$ (59/41 wt. %) | 115 | 6 | 100 | 26,000 |

Elemental analysis data for Examples 11–21 are given in Table 6.

TABLE 6

Elemental Analyses

| Example | % C | % H | % Cl | % F |
|---|---|---|---|---|
| 11 | 24.43 | .03 | .36 | 71.98 |
| 12 | 24.02 | 0 | 1.62 | 71.68 |
| 13 | 23.94 | .10 | .88 | 69.7 |
| 14 | 23.68 | .02 | 2.90 | 71.41 |
| 15 | 24.74 | .13 | .85 | 74.22 |
| 16 | 18.81 | 0 | .55 | 80.81 |
| 17 | 23.52 | .14 | 1.22 | 64.75 |
| 18 | 23.80 | .16 | .90 | 72.86 |
| 19 | 23.36 | .04 | 2.14 | 69.95 |
| 20 | 20.60 | .25 | .13 | 71.30 |
| 21 | 21.90 | .11 | .60 | 76.09 |

The fluorocarbon telomers of this invention prepared using HCFC's as telogen/solvent were evaluated for grease thickening efficiency, oil separation characteristics of the grease, wear test performance of the grease, and lubricity. Results are shown as Table 7. Additional lubricity data, obtained by a different method, are given in Table 8.

Grease samples were prepared using "KRYTOX"® GPL-106 Fluorinated Oil (viscosity @ 40° C., 240 centistokes) as the base oil. KRYTOX® Fluorinated Oils are a family of compounds having the formula:

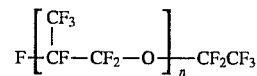

wherein n is about 10–60. In "KRYTOX"® GPL-106, n is about 30–35. Enough dispersion was used to give 15 mass-percent solids (based on solids content reported for the dispersion). After "drying" to remove the dispersion solvent, the slurry was milled three times at 0.0015 inch clearance on a 3-roll ink mill. Penetrations (consistency), oil separation by centrifuge and 4-ball wear performance were measured.

Two Controls were used in the evaluations. One Control (used in grease evaluation) was "VYDAX"®-1000 telomer prepared by reacting TFE and "FREON"®-113. The other Control (used in mold release test or lubricity) "VYDAX"®-AR was a mixture of telomers consisting of TFE/"FREON"®-113 telomer and TFE/"FREON"®-113/methylcyclohexane telomer prepared by reacting TFE, "FREON"®-113. and methylcyclohexane(an "Active Telogen").

Thickening Efficiency

At least one additional grease sample was prepared from each candidate dispersion. The consistency as a function of solids content allowed calculation of solids required to prepare a grease of a given consistency (penetration = 245).

Grease Performance

Table 7 shows the oil separation characteristics of several experimental grease samples. These data were obtained in a laboratory centrifuge operating for 20 hours at 200° F. Oil separation was least for the Control "VYDAX"® 1000 fluorotelomer dispersion. There was some variation as a function of consistency, but it was small.

Wear Test Performance

Wear measurements using the 4-ball wear tester were made on the samples prepared in the concentration study. Wear measurements on greases are difficult and, normally, of poor repeatability. There did not appear to be any correlation of the wear scar level with thickening efficiency or oil separation tendency for these greases. All are, however, within a range normally observed for this kind of grease. The Wear Test also provided the Coefficient of Friction data set forth in Table 7. The Penetration data were obtained by use of ASTM No. D1403, the Oil Separation data by use of FTMS No. 791B,321.2, and the 4-Ball Wear data by use of ASTM No. D2266.

Lubricity

The Coefficient of Friction data in Table 8 were made on an Inclined Plane apparatus, Model 32–35 of Testing Machinery, Inc.

TABLE 7

Telomers as Grease Thickening Agents

| Example | Penetration | Oil Sep. % Loss | Wear Scar. mm | Coeff. Friction |
|---|---|---|---|---|
| 9 | 249 | 6.07 | .459 | .092 |
| 16 | 242 | 12.9 | .52 | .12 |
| 17 | 223 | 12.0 | .94 | .12 |
| 18 | 227 | 10.2 | .79 | .13 |
| 19 | 245 | 16.1 | .67 | .13 |
| 20 | 275 | N.D. | .69 | .12 |
| Control (VYDAX ® 1000) | 212 | 26.7 | .71 | .14 |

TABLE 8

Lubricity

| Example | Coeff. Friction |
|---|---|
| 1 | 0.187 |
| 2 | 0.180 |
| 3 | 0.218 |
| 4 | 0.100 |
| 11 | 0.31 |
| 12 | 0.27 |
| 13 | 0.32 |
| 14 | 0.32 |

TABLE 8-continued

Lubricity

| Example | Coeff. Friction |
|---|---|
| Control (VYDAX ® AR) | 0.28 |

I claim:

1. A process for preparing a fluorotelomer which comprises reacting a fluoroalkene monomer of from 2 to 3 carbon atoms and 2 to 6 fluorine atoms, or a mixture thereof with a copolymerizable monomer, with a hydrochlorofluorocarbon telogen in solution in said hydrochlorofluorocarbon in the presence of a free radical initiator at a temperature in excess of 105° C. and up to 200° C., wherein said hydrochlorofluorocarbon consists essentially of an organic compound having the formula:

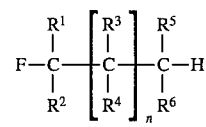

wherein $R^1$, $R^2$, $R^3$ and $R^4$ are each independently Cl or F;

$R^5$ and $R^6$ are each independently H, Cl or F, provided that when either of $R^5$ or $R^6$ is F, the other is H;

and n is 0 or 1.

and recovering a fluorotelomer having a number average molecular weight between 1800 and 75,000.

2. The process of claim 1 wherein said hydrochlorofluorocarbon is selected from the group consisting of 1,1-dichloro-1-fluoroethane ($Cl_2CF\text{—}CH_3$);

1,2,2-trichloro-1,1-difluoroethane ($ClCF_2\text{—}CHCl_2$);

1,1-dichloro-2,2,2-trifluoroethane ($Cl_2CH\text{—}CF_3$);

1,1-dichloro-1,2-difluoroethane ($Cl_2CF\text{—}CFH_2$);

1,1-dichloro-2,2,3,3,3-pentafluoropropane ($Cl_2CHC_2F_5$);

1,3-dichloro-1,2,2,3,3-pentafluoropropane ($ClCFH\text{—}CF_2CF_2Cl$);

2,2-dichloro-1,1,3,3,3-pentafluoropropane ($F_2CH\text{—}CCl_2\text{—}CF_3$); and mixtures thereof.

3. The process of claim 2 wherein said telomer has a number average molecular weight in the range between 3000 and 6000.

4. The process of claim 3 wherein said telomer has a number average molecular weight in the range between 4000 and 5000.

5. The process of claim 2 wherein said telomer has a number average molecular weight in the range between 15,000 and 50,000.

6. The process of claim 5 wherein said telomer has a number average molecular weight in the range between 25,000 and 35,000.

7. The process of claim 2 wherein said hydrochlorofluorocarbon is 1,1-dichloro-1-fluoroethane.

8. The process of claim 2 wherein, in addition to said hydrochlorofluorocarbon, an additional chain transfer agent is used in an amount tip to 4 mol %, based on the total number of moles of monomer or mixture of monomers being used.

9. The process of claim 2 wherein said fluoroalkene monomer is tetrafluoroethylene.

* * * * *